United States Patent
Crovetto et al.

(10) Patent No.: US 8,025,840 B2
(45) Date of Patent: Sep. 27, 2011

(54) COMPOSITIONS AND METHODS FOR INHIBITING CORROSION IN AQUEOUS MEDIA

(75) Inventors: Rosa Crovetto, Wayne, PA (US); Claudia C. Pierce, Trenton, NJ (US); Philip D. Deck, Glenside, PA (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 12/262,833

(22) Filed: Oct. 31, 2008

(65) Prior Publication Data

US 2010/0111756 A1     May 6, 2010

(51) Int. Cl.
*C23F 11/00* (2006.01)

(52) U.S. Cl. ............. 422/17; 422/7; 422/15; 422/16; 252/387; 252/388; 252/394; 252/395; 252/396

(58) Field of Classification Search .......... 422/7, 15, 422/16, 17; 252/387, 388, 394, 395, 396
See application file for complete search history.

(56) References Cited

U.S. PATENT DOCUMENTS

| | | |
|---|---|---|
| 2,529,177 A | 11/1950 | Nieland et al. |
| 2,529,178 A | 11/1950 | Nieland et al. |
| 3,589,859 A | 6/1971 | Foroulis |
| 3,696,044 A | 10/1972 | Rutledge |
| 3,738,806 A | 6/1973 | Feiler, Jr. |
| 3,910,951 A | 10/1975 | Fuerst et al. |
| 3,959,168 A | 5/1976 | Germscheid et al. |
| 3,962,109 A | 6/1976 | Oberhofer et al. |
| 3,965,024 A | 6/1976 | Schmadel et al. |
| 4,020,101 A | 4/1977 | Geffers et al. |
| 4,029,577 A | 6/1977 | Godlewski et al. |
| 4,085,060 A | 4/1978 | Vassileff |
| 4,113,498 A | 9/1978 | Rones et al. |
| 4,120,655 A | 10/1978 | Crambes et al. |
| 4,303,568 A | 12/1981 | May et al. |
| 4,372,870 A | 2/1983 | Snyder et al. |
| 4,512,552 A | 4/1985 | Katayama et al. |
| 4,588,786 A | 5/1986 | Kadono et al. |
| 4,654,159 A | 3/1987 | Bush et al. |
| 4,659,481 A | 4/1987 | Chen |
| 4,717,499 A | 1/1988 | Chen |
| 4,841,069 A | 6/1989 | Olsen |
| 5,073,299 A | 12/1991 | Cook |
| 5,147,555 A | 9/1992 | Brown et al. |
| 5,183,590 A | 2/1993 | Carter et al. |
| 5,256,332 A | 10/1993 | Kessler |
| 5,468,393 A | 11/1995 | Zidovec et al. |
| 5,693,290 A | 12/1997 | Kessler et al. |
| 5,866,042 A | 2/1999 | Chen et al. |
| 5,916,379 A | 6/1999 | Varley et al. |
| 6,365,774 B1 | 4/2002 | O'Lenick, Jr. |
| 6,572,789 B1 | 6/2003 | Yang et al. |
| 6,585,933 B1 * | 7/2003 | Ehrhardt et al. ............... 422/16 |
| 6,642,192 B1 | 11/2003 | O'Lenick, Jr. |
| 7,094,852 B2 | 8/2006 | Solov et al. |

FOREIGN PATENT DOCUMENTS

| | | |
|---|---|---|
| CA | 840626 | 4/1970 |
| EP | 0265723 A1 | 5/1988 |
| EP | 0283191 A2 | 9/1988 |
| EP | 0 652 305 A1 | 10/1995 |
| GB | 852 958 | 11/1960 |
| GB | 866840 A | 5/1961 |
| JP | 59-222588 | 12/1984 |
| JP | 2005-217776 | 8/2005 |

OTHER PUBLICATIONS

International Search Report issued in connection with corresponding PCT Application No. PCT/US2009/058584 on Mar. 31, 2010.

* cited by examiner

*Primary Examiner* — Jill Warden
*Assistant Examiner* — Monique Cole
(74) *Attorney, Agent, or Firm* — Wegman, Hessler & Vanderburg

(57) ABSTRACT

Methods and compositions are provided for corrosion inhibition treatment of aqueous systems such as cooling water systems. The methods include conjoint use of a polyvalent metal ion, such as Al or Mn and a corrosion inhibitor/deposit control agent (DCA) to the water system. The corrosion inhibitor DCA agent may be an organic compound such as a hydroxyacid, phosphonocarboxylic acid, polyhydroxysuccinic acid, or polymaleic acid or anhydride.

16 Claims, No Drawings

COMPOSITIONS AND METHODS FOR INHIBITING CORROSION IN AQUEOUS MEDIA

FIELD OF INVENTION

The present invention relates to the treatment of aqueous systems to reduce corrosion on the metallic surfaces in contact therewith in which the dosage of organic inhibitors is limited in order to aid in the reduction of the carbon footprint of the treatment.

BACKGROUND OF THE INVENTION

The problems of corrosion and attendant effects such as pitting have troubled water systems for years. For instance, scale tends to accumulate on internal walls of various water systems, and thereby materially lessens the operational efficiency of the system. In this manner, heat transfer functions of the particular system are severely impeded.

Corrosion is a degradative electrochemical reaction of a metal with its environment. It is the reversion of refined metals to their natural state. For example, iron ore is iron oxide. Iron oxide is refined into steel. When the steel corrodes, it forms iron oxide which, if unattended, may result in failure or destruction of the metal, causing the particular water system to be shut down until the necessary repairs can be made.

Typically, in cooling water systems, corrosion along with pitting has proven deleterious to the overall efficiency of the system. Many cooling water systems employ orthophosphate in the system treatment to promote passivation of the metal surfaces in contact with the system water. However, current costs of phosphorus based inhibitors have skyrocketed due to increased demand of $P_2O_5$ ores for agricultural fertilizers. Also, environmental regulations in the United States and Europe have increased restriction on phosphate discharge into local rivers and streams.

Accordingly, low or no phosphate treatment programs have seen increasing use with a concurrent emphasis on all or predominantly organic treatment programs that typically require relatively higher treatment dosages (i.e., >50 ppm) to be effective. Unfortunately, these high level organic treatment dosages increase the biological food in the system (carbon footprint) and increase the need for feed of toxic biocidal compounds to the system.

The benefit of carbon footprint reduction can be viewed from two different perspectives. First, carbon footprint reduction can be viewed in terms of savings in energy consumption that otherwise would be needed to synthesize the organic inhibitor. Here, the lesser amount of organic material that need be generated results in less waste, fewer emissions, etc.

Secondly, the reduction in the generation of food for biological growth results in reduction in the feed levels of biocide needed to control microbial activity.

SUMMARY OF THE INVENTION

The invention is directed toward methods for inhibiting the corrosion of metals in contact with an aqueous system, such as a cooling water system, comprising adding to the aqueous system a polyvalent metal ion and an organic corrosion inhibiting or deposit control agent compound. In one preferred embodiment, the polyvalent metal ion is selected from the group consisting of Al and Mn.

The corrosion inhibition/deposit control agent (DCA) compound may, in one embodiment of the invention, be selected from the group of hydroxyacids, phosphonocarboxylic acids, polyhydroxysuccinic acids, and polymaleic acid or polymaleic anhydride.

The polyvalent metal salt may be present in the water system in an amount of about 0.1-10 ppm with the organic corrosion inhibitor/DCA compound being present in an amount of about 1 to less than 50 ppm. This low level dosage of the organic corrosion inhibitor/DCA compound helps to improve the carbon footprint of the treatment compared to many all organic or organic/low phosphate treatments currently in use.

Aqueous based compositions comprising the polyvalent metal ion and corrosion inhibiting/DCA compound are also provided wherein the molar ratio of about one part polyvalent metal ion to about 0.1-500 parts of the corrosion inhibitor/DCA are present.

DETAILED DESCRIPTION

We have discovered that the use of polyvalent metal ions, such as Al and Mn, significantly reduces the concentration of hydroxy acids, phosphonocarboxylic acids, polyaklylhydroxysuccinic acids and polymaleic acids or anhydrides necessary to provide effective corrosion and disposition control in water systems such as in industrial cooling towers.

In one aspect of the invention, a method of inhibiting the corrosion of metals in aqueous systems is provided wherein a polyvalent metal ion and a corrosion inhibiting or deposit control agent (DCA) compound are added to the system. In one particular embodiment from about 0.1-10 ppm of the polyvalent metal ion is added with the corrosion inhibitor being fed in an amount of about 1 to less than 50 ppm. These feed levels highlight one feature of the invention in that the "carbon footprint" of the corrosion inhibitor/DCA is improved due to the decreased dosage level resulting from the invention. That is, less than normal or traditional feed levels may be used for the corrosion inhibitor/DCA.

As to the polyvalent metal ion that may be used, in one embodiment, these can be chosen from the group consisting of $Mn^{+2}$, $Ni^{+2}$, $Al^{+3}$, and $Sn^{+2}$. Preferably, the ions are selected from Al and Mn. Exemplary salts that may be used for Al and Mn ions include manganese chloride, manganese nitrate, manganese acetate, and manganese ammonium sulfate. Exemplary Al salts include aluminum acetate, aluminum bromate, aluminum bromide, and hexa and penta hydrates thereof, aluminum chlorate, aluminum citrate, aluminum chloride, and the hexahydrate thereof, aluminum fluoride, aluminum iodide and the hexahydrate, aluminum lactate, aluminum nitrate, aluminum sulfate and the hydrate thereof.

As to the corrosion inhibitor/DCA compounds that may be added, these include hydroxyacids, phosphonocarboxylic acids, polyhydroxysuccinic acids and polymaleic acid or anhydride. The hydroxyacids, in one specific embodiment, are represented by the formula

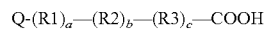

$$Q\text{-}(R1)_a\text{—}(R2)_b\text{—}(R3)_c\text{—}COOH$$

wherein a, b, and c are integers of about 1 to 6 with the proviso that (a+b+c>0); R1, R2, and R3 are repeat units in either random or block sequence and are individually chosen from C=O or CYZ wherein Y and Z are individually selected from the group of H, OH, CHO, COOH, $CH_3$, $CH_2OH$, $CH(OH)_2$, $CH_2(COOH)$, $CH(OH)(COOH)$, $CH_2(CHO)$ and $CH(OH)$ CHO so that said B1 has a minimum of one OH group as written in its fully hydrated form. Q in the formula is either COOH or $CH_2OH$. In another embodiment, the hydroxyacids are selected from mucic acid, D-saccharic acid, ketomalonic acid, tartaric acid, and citric acid. D-saccharic acid is preferred.

Phosphonocarboxylic acids may also be used as the corrosion inhibitor/DCA that is to be conjointly used with the polyvalent metal ions. In one aspect of the invention, these may be chosen from phosphonosuccinic acid oligomers, phosphonosuccinic acid, and telomeric phosphono polycarboxylic acids of the formula

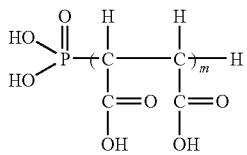

wherein m is about 2-7, preferably 2-3, most preferably averaging 2-5.

In one embodiment, the phosphonocarboxylic acid comprises a mixture of phosphonosuccinic acid.

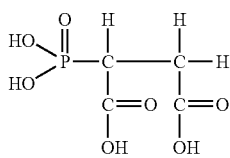

and the above telomeric phosphonopolycarboxylic acid wherein m is about 2.5. This mixture is commercially available under the Bricorr 288 trademark from Rhodia. This product is reputedly 60% phosphonosuccinic acid and 40% of the telomeric compound.

As to the phosphonosuccinic oligomer (PSO) above mentioned, this has the formula

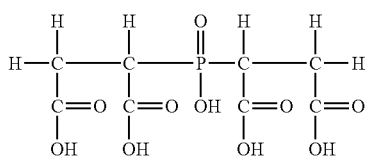

This compound is reported in U.S. Pat. No. 6,572,789, formula 2, column 5. As reported in this patent, the PSO is prepared by addition of hypophosphite to an aqueous maleic acid or fumaric acid slurry or suspension to create a reaction mixture followed by addition of a free radical initiator. Typical slurries have solids contents of between about 35-50% by weight.

The reaction mixture may optionally be heated at about 40° C. to about 75° C. following the addition of the hypophosphite to result in conversion of the reactants to the desired phosphonosuccinic acids adducts. The reaction mixture may be partially or totally neutralized with bases such as NaOH, KOH, NH$_4$OH, etc.

Exemplary free radical initiators include persulfates, peroxides, and diazo compounds. A preferred initiator is ammonium persulfate. The initiator may be present in an amount of about 10-15 mole percent based on the presence of the hypophosphite.

The '789 patent further reports that if the reaction is carried out with fumaric acid (trans 1,4-butanedioic acid) as compared to maleic acid (CIS 1,4-butanedioic acid) the formation of the bis adduct (PSO above) is promoted.

In another aspect of the invention, the corrosion inhibitor/DCA is a polyhydroxysuccinic acid or derivative having the formula

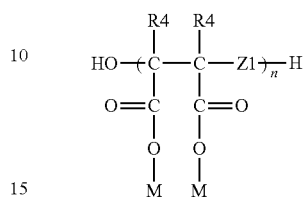

wherein Z1 is a divalent group chosen from —O—, —NH—, and diaminoxylylene, n is an integer of from 1 to about 5, M is H or a cation, and each R4 is independently selected from H, $C_1$-$C_4$ alkyl or $C_1$-$C_4$ substituted alkyl.

In one embodiment, the polyhydroxy succinic acid is a polyepoxysuccinic acid (PESA) having the formula

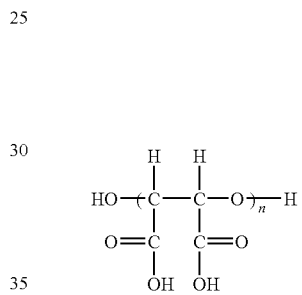

wherein n is 2-3.

The PESAs are described in U.S. Pat. Nos. 5,236,332 and 4,654,159, both incorporated by reference herein. The PESAs are generally described as a polyacid. Although, primarily added to cooling water chemistries as a deposit control agent (DCA), it has been recognized that this chemistry provides some modest corrosion benefit. However, in combination with the polyvalent metal ions, the resulting corrosion inhibiting properties are greater than what may be expected, based on its use alone.

In another aspect of the invention, the polyhydroxysuccinic acid is ammonia hydroxysuccinic acid having the formula

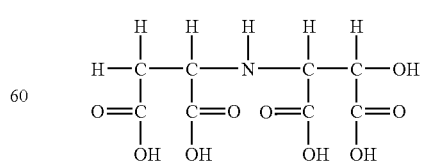

Ammonia (AM-HAS). This component is made in accordance with the procedures reported in U.S. Pat. No. 5,183,590.

Another exemplary polyhydroxysuccinic acid is p-xylylene-HSA having the general formula

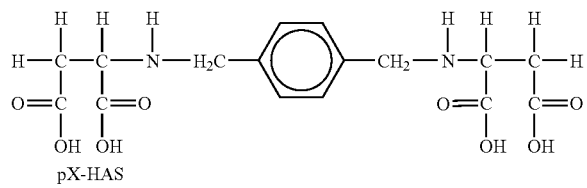

pX-HAS

This compound is made in accord with the procedures set forth in U.S. Pat. No. 5,183,590.

In another embodiment of the invention, a polymaleic acid (PMA) or anhydride thereof can be used as the corrosion inhibitor/DCA conjointly with the polyvalent metal ion. Quite surprisingly, we have found that PMAs that are polymerized in an aqueous media perform much better than those that have been polymerized in an organic solvent such as toluene or xylene. For example, PMAs that, in accordance with the invention, may be employed as the corrosion inhibitor/deposit control agent (DCA), may be polymerized in aqueous solution from maleic acid monomer in the presence of metal ions such as iron, vanadium, and/or copper with the use of hydrogen peroxide as the catalyst. One exemplary waterborne PMA in accordance with the invention is PMA 2A from SNF having a molecular weight of about 630. Other waterborne PMAs include Aquatreat 802 available from Akzo Nobel MW≈640; and water based PMAs available from Jiangsu Jianghai. Waterborne PMAs then are defined as those that have been polymerized in an aqueous medium.

Compositions in accordance with the invention include combinations of the polyvalent metal ions and corrosion inhibitor/DCA, preferably in aqueous solution or suspension. Generally, the polyvalent metal salt:corrosion inhibitor/DCA is present in such compositions in a molar range of about 1 part polyvalent metal ion to about 0.1-5,000 parts of the corrosion inhibitor.

The following examples are included as being illustrative of the invention and should not be construed as limiting the scope thereof.

EXAMPLES

Corrosion tests were performed using the Beaker Corrosion Test Apparatus (BCTA). This test evaluates the corrosion of low carbon steel electrodes in water over an 18 hour period at a temperature of 120° F. The water chemistry is modified by the addition of soluble hardness salts, silica, and alkalinity to simulate the water chemistry of industrial cooling towers. Typically the water chemistry included:

| | |
|---|---|
| Ca | 400 ppm as $CaCO_3$ |
| Mg | 150 ppm as $CaCO_3$ |
| $SiO_2$ | 30 ppm as $SiO_2$ |
| Cl | 283 ppm as Cl |
| $SO_4$ | 450 ppm as $SO_4$ |
| M-alkalinity | 200 ppm as $CaCO_3$ |

Water pH was adjusted to 8.0 before the beginning of the BCTA test and allowed to drift during the run. Typically, the pH climbed to a value of 8.4 to 8.6 over the course of the run.

Data generated from these experiments and shown in the following tables include mild steel corrosion rates taken at the conclusion of the 18 hour experiment as derived by an electrochemical linear polarization scan, and a corrosion appearance rating of the low carbon steel test coupons exposed in these waters. The rating scale for the coupon appearance is:

| Rating | Coupon appearance |
|---|---|
| 0 | perfect; no pits |
| 1 | Blemishes |
| 2 | 1 or 2 pits |
| 3 | 3 or more pits |
| 4 | 4 or more pits |
| 5 | 5 or more pits |
| 6 | Moderate pit density (30% coverage) |
| 7 | Moderate pit density (50% coverage) |
| 8 | Moderate pit density (70% coverage) |
| 9 | Heavy pit density (80% coverage) |
| 10 | Heavy pit density (>90% coverage) |

Coupon appearance ratings of 2 or greater are considered unacceptable.

Example 1

Experimental Treatments
Al 0.5—Effect on Saccharic Acid (SA) Concentration
Ca 250, Mg 100, Malk 175, 4 Dispersant I, 8 PESA, 0.6 $PO_4$
PESA=polyepoxysuccinic acid; Dispersant I=acrylic acid/allyl hydroxy propyl sulfonate ether copolymer (AA/AHPSE)—U.S. Pat. No. 4,717,499.

Data in Example 1 show how the addition of 0.5 Al to different concentrations of Saccharic acid significantly reduces the corrosion rate and improves the appearance of the metal surface. In this specific example, acceptable performance is achieved at SA/Al=20/0.5 combinations. In absence of Al, 30 ppm of Saccharic acid is needed to achieve acceptable performance.

TABLE 1

Impact of Al on Saccharic Acid

| | Actives ppm [SA] | Actives ppm [Al] | corrosion rate (mpy) | appearance rating |
|---|---|---|---|---|
| 1.1 | 15 | 0.0 | 3.90 | 7 |
| 1.2 | 15 | 0.5 | 2.72 | 1 |
| 1.3 | 20 | 0.0 | 2.63 | 4 |
| 1.4 | 20 | 0.5 | 0.62 | 1 |
| 1.5 | 30 | 0.0 | 0.86 | 1 |
| 1.6 | 30 | 0.5 | 0.41 | 0 |

Example 2

Al and Mn—Effect on Saccharic Acid (SA) Concentration
Ca 400, Mg 150, $SiO_2$ 30, Malk 200, 4-8 (Dispersant I or II), 8 PESA, 1 $PO_4$.
Dispersant II=acrylic acid/ammonium allyl polyethoxy sulfate copolymer (AA/APES)—U.S. Pat. No. 7,094,852.

Data in Table 2 show how the addition of low concentrations of Al and Mn affect the concentration of saccharic acid needed to provide acceptable performance. Under these experimental conditions in this specific example, acceptable performance is achieved at SA/Al=25/0.25 and SA/Mn=25/05 combinations. In absence of divalent metal ions like Al or Mn, 35 ppm of saccharic acid is needed to achieve acceptable performance.

TABLE 2

Impact of Al and Mn on Saccharic Acid

| | Actives ppm [SA] | Actives ppm [Al] | Actives ppm [Mn] | corrosion rate (mpy) | appearance rating |
|---|---|---|---|---|---|
| 2.1 | 25 | 0.00 | 0.00 | 1.73 | 3 |
| 2.2 | 35 | 0.00 | 0.00 | 0.72 | 0 |
| 2.3 | 25 | 0.25 | 0.00 | 1.39 | 0 |
| 2.4 | 25 | 0.50 | 0.00 | 0.73 | 0 |
| 2.5 | 25 | 0.00 | 0.50 | 1.00 | 0 |
| 2.6 | 25 | 0.00 | 2.00 | 0.47 | 0 |

Example 3

Al—Effect on Different Hydroxy Acids
Ca 400, Mg 150, SiO$_2$ 30, Malk 200, 4-8 (Dispersant I or III), 8 PESA.
Dispersant III=acrylic acid/allyl hydroxy propyl sulfonate ether/ammonium allyl polyethoxy sulfate terpolymer (AA/AHPSE/APES)—U.S. Pat. No. 7,094,852.
Data in Table 3 show how the addition of divalent metal ions impacts the concentration of hydroxyacids needed to provide acceptable performance.

Examples 3_1-3_5 in Table 3 show that excellent performance can be achieved with 100 ppm of poly (epoxy succinic acid) of low degree of polymerization (DP 2-3). The use of 0.5 ppm Al can reduce the carbon footprint of this material to 25 ppm, a 75% reduction in carbon footprint contribution.

Examples 3_6-3_12 for p-Xylylene-HSA (pX-HSA) in Table 3 show excellent performance can be obtained at 80 ppm. Alternatively, excellent performance can be obtained for pX-HSA/Al=20/1 or 10/2, i.e., a 75-88% reduction in carbon footprint contribution. Examples 3_13-3_15 show that Ammonia-HSA (AM-HSA) to be equivalent to pX-HSA at an AM-HSA/Al=20/0.5.

Examples 3_16-3_17 for PSO in Table 3 show that concentration >40 ppm are needed to achieve treatment effectiveness. In contrast, addition of 0.5 Al for a PSO/Al=40/0.5 gives excellent performance, corresponding to a >50% reduction in carbon footprint contribution.

In the case of Bricorr 288, Examples 3_18-3_19 of Table 3 indicate that acceptable performance can be achieved at a ratio of organic/Al=3/0.5, a 70% reduction in carbon footprint contribution.

For compound VI (gluconic acid), the performance was not acceptable even at 40/0.5 ppm organic/Al ratio, thus eliminating this material from the list of preferred compounds.

TABLE 3

Impact of Al on Hydroxy Acids

| | I | II | III | IV | V | VI | VII | [PO4] | [Al] | corrosion rate in mpy | appearance rating |
|---|---|---|---|---|---|---|---|---|---|---|---|
| 3_1 | 100.00 | 0.00 | 0.00 | 0.00 | 0.00 | 0.00 | 0.00 | 0.00 | 0.00 | 0.57 | 0 |
| 3_2 | 40.00 | 0.00 | 0.00 | 0.00 | 0.00 | 0.00 | 0.00 | 0.00 | 0.00 | 3.49 | 8 |
| 3_3 | 40.00 | 0.00 | 0.00 | 0.00 | 0.00 | 0.00 | 0.00 | 1.00 | 0.00 | 3.94 | 4 |
| 3_4 | 40.00 | 0.00 | 0.00 | 0.00 | 0.00 | 0.00 | 0.00 | 1.00 | 0.50 | 0.58 | 0 |
| 3_5 | 20.00 | 0.00 | 0.00 | 0.00 | 0.00 | 0.00 | 0.00 | 1.00 | 0.50 | 1.01 | 1 |
| 3_6 | 0.00 | 80.00 | 0.00 | 0.00 | 0.00 | 0.00 | 0.00 | 0.00 | 0.00 | 0.40 | 0 |
| 3_7 | 0.00 | 40.00 | 0.00 | 0.00 | 0.00 | 0.00 | 0.00 | 0.00 | 0.00 | 4.70 | 3 |
| 3_8 | 0.00 | 40.00 | 0.00 | 0.00 | 0.00 | 0.00 | 0.00 | 3.00 | 0.00 | 0.10 | 1 |
| 3_9 | 0.00 | 40.00 | 0.00 | 0.00 | 0.00 | 0.00 | 0.00 | 2.00 | 0.00 | 0.10 | 0 |
| 3_10 | 0.00 | 40.00 | 0.00 | 0.00 | 0.00 | 0.00 | 0.00 | 1.00 | 0.00 | 0.10 | 0 |
| 3_11 | 0.00 | 20.00 | 0.00 | 0.00 | 0.00 | 0.00 | 0.00 | 1.00 | 0.00 | 0.50 | 0 |
| 3_12 | 0.00 | 10.00 | 0.00 | 0.00 | 0.00 | 0.00 | 0.00 | 2.00 | 0.00 | 0.80 | 0 |
| 3_13 | 0.00 | 0.00 | 40.00 | 0.00 | 0.00 | 0.00 | 0.00 | 1.00 | 0.50 | 0.67 | 0 |
| 3_14 | 0.00 | 0.00 | 20.00 | 0.00 | 0.00 | 0.00 | 0.00 | 1.00 | 0.50 | 0.81 | 0 |
| 3_15 | 0.00 | 0.00 | 10.00 | 0.00 | 0.00 | 0.00 | 0.00 | 1.00 | 0.50 | 1.45 | 3 |
| 3_16 | 0.00 | 0.00 | 0.00 | 40.00 | 0.00 | 0.00 | 0.00 | 1.00 | 0.00 | 10.30 | 7 |
| 3_17 | 0.00 | 0.00 | 0.00 | 40.00 | 0.00 | 0.00 | 0.00 | 1.00 | 0.50 | 0.87 | 1 |
| 3_18 | 0.00 | 0.00 | 0.00 | 0.00 | 3.00 | 0.00 | 0.00 | 1.00 | 0.50 | 1.03 | 1 |
| 3_19 | 0.00 | 0.00 | 0.00 | 0.00 | 5.00 | 0.00 | 0.00 | 1.00 | 0.50 | 0.77 | 1 |
| 3_20 | 0.00 | 0.00 | 0.00 | 0.00 | 10.00 | 0.00 | 0.00 | 1.00 | 0.50 | 0.64 | 0 |
| 3_21 | 0.00 | 0.00 | 0.00 | 0.00 | 0.00 | 20.00 | 0.00 | 1.00 | 0.00 | 1.82 | 9 |
| 3_22 | 0.00 | 0.00 | 0.00 | 0.00 | 0.00 | 20.00 | 0.00 | 1.00 | 0.50 | 1.20 | 6 |
| 3_23 | 0.00 | 0.00 | 0.00 | 0.00 | 0.00 | 40.00 | 0.00 | 1.00 | 0.50 | 2.73 | 9 |
| 3_24 | 0.00 | 0.00 | 0.00 | 0.00 | 0.00 | 40.00 | 0.00 | 1.00 | 0.50 | 1.20 | 4 |
| 3_25 | 0.00 | 0.00 | 0.00 | 0.00 | 0.00 | 0.00 | 30.00 | 1.00 | 0.00 | 8.66 | 8 |
| 3_26 | 0.00 | 0.00 | 0.00 | 0.00 | 0.00 | 0.00 | 30.00 | 1.00 | 0.50 | 0.89 | 6 |
| 3_27 | 0.00 | 0.00 | 0.00 | 0.00 | 0.00 | 0.00 | 40.00 | 1.00 | 0.00 | 5.69 | 6 |
| 3_28 | 0.00 | 0.00 | 0.00 | 0.00 | 0.00 | 0.00 | 40.00 | 1.00 | 0.50 | 0.53 | 1 |

Where:
I PESA DP2
II p-Xylylene-HSA (pX-HSA)
III Ammonia-HSA (AM-HSA)
IV Phosphino Succinic Oligomer (PSO)
V Bricorr 288
VI Gluconic Acid
VII Glucoheptonic Acid Example 4

Al—Effect on Different Polymaleic Acids
Ca 400, Mg 150, SiO$_2$ 30, Malk 200, 4-8 (Dispersant I or III), 8 PESA, 1 PO$_4$ Data in Table 4 show how the addition of divalent metal ions impact the concentration of polymaleic acids needed to provide acceptable performance. Examples 4_1, 4_2 and 4_3 of Table 4 show the general trend that increasing the organic inhibitor content improves the performance in the system; however, concentration >20 ppm are needed to achieve treatment effectiveness. In contrast, addition of 0.5 Al for a PMA/Al=10/0.5 gives excellent performance, corresponding to a >50% reduction in carbon footprint contribution.

Examples 4_7 through 4_15 of Table 4 show that all Polymaleic acids give an acceptable corrosion protection in the PMA/Al=15/0.5 ratio without the addition of PESA, a proprietary scale and corrosion inhibitor agent.

TABLE 4

Impact of Al on Polymaleic Acids

| | I | II | III | IV | [PESA] | [Al] | corrosion rate in mpy | appearance rating |
|---|---|---|---|---|---|---|---|---|
| 4_1 | 10.00 | 0.00 | 0.00 | 0.00 | 8.00 | 0.00 | 29.60 | 10 |
| 4_2 | 10.00 | 0.00 | 0.00 | 0.00 | 8.00 | 0.50 | 1.32 | 0 |
| 4_3 | 15.00 | 0.00 | 0.00 | 0.00 | 8.00 | 0.00 | 10.60 | 9 |
| 4_4 | 15.00 | 0.00 | 0.00 | 0.00 | 8.00 | 0.50 | 1.15 | 0 |
| 4_4 | 20.00 | 0.00 | 0.00 | 0.00 | 8.00 | 0.00 | 6.98 | 7 |
| 4_5 | 20.00 | 0.00 | 0.00 | 0.00 | 8.00 | 0.50 | 1.41 | 0 |
| 4_7 | 15.00 | 0.00 | 0.00 | 0.00 | 0.00 | 0.50 | 1.32 | 0 |
| 4_8 | 20.00 | 0.00 | 0.00 | 0.00 | 0.00 | 0.50 | 1.25 | 1 |
| 4_9 | 0.00 | 15.00 | 0.00 | 0.00 | 0.00 | 0.50 | 1.08 | 0 |
| 4_10 | 0.00 | 20.00 | 0.00 | 0.00 | 0.00 | 0.50 | 1.25 | 1 |
| 4_11 | 0.00 | 0.00 | 8.00 | 0.00 | 0.00 | 0.50 | 2.62 | 8 |
| 4_12 | 0.00 | 0.00 | 12.00 | 0.00 | 0.00 | 0.50 | 2.54 | 1 |
| 4_13 | 0.00 | 0.00 | 14.00 | 0.00 | 0.00 | 0.50 | 2.03 | 1 |
| 4_14 | 0.00 | 0.00 | 0.00 | 15.00 | 0.00 | 0.50 | 1.10 | 1 |
| 4_15 | 0.00 | 0.00 | 0.00 | 20.00 | 0.00 | 0.50 | 1.06 | 0 |

Where:
I PMA2A - waterborne PMA; MW ≈ 630, SNF
II Aquatreat AR-802 - waterborne PMA; MW ≈ 640 - Akzo Nobel
III Acumer 4210 - organic solvent based PMA - Rohm & Haas, MW ≈ 860
IV Belclene 200 - organic solvent based PMA - Houghton Chemical, MW ≈ 680

Example 5

BTU: Effect of Al Addition to different Polymaleic Acids
Ca 400, Mg 150, SiO$_2$ 50, Malk 200, pH 8.6, 8 Dispersant III, 1 o-PO$_4$, 0.3-0.5 ppm Al—0.2 ppm Residual Chlorine Further testing of these polymaleic acids in recirculating cooling water conditions shows that significant performance differences exist among these materials. As shown in Table 5, it is an unexpected result that polymaleic acids synthesized in a water media offer excellent treatment efficacy, while those synthesized in solvent media do not.

TABLE 5

| synthesis based | Compound | ppm active | Pit Depth (microns) | Deposition |
|---|---|---|---|---|
| Water | PESA | 10 | 105 | Fail |
| Solvent | IV | 10 | 109 | Fail |
| Solvent | IV | 20 | NO PITS | Fail |
| Solvent | IV | 25 | NO PITS | Fail |
| Water | I | 20 | NO PITS | Pass |
| Water | I | 25 | NO PITS | Pass |

In one aspect of the invention, a preferred treatment is:
DCA—PMA; Aquatreat 802—Akzo Nobel—20-25 ppm;
Al salt—0.3-0.5 ppm;
Phosphate—0.1-1 ppm max;
Polymeric Dispersant—I, II or III Without the use of 1 ppm PO$_4$ coming from natural contamination of the make up water (MU) (i.e. ≈0.2 ppm in MU×5 cycles of operation=1 ppm PO$_4$ in water tower), this preferred combination does not work well. The phosphates, from whatever source, normally revert to orthophosphate in water systems.

Accordingly, in another aspect of the invention, the desired treatment is used in cooling waters of the type having residual phosphate therein which upon recycling can be present in the amount of about 0.1-1.0 ppm.

Additionally, polymeric dispersants such as acrylic acid, and copolymers of acrylic acid with lower alkyl acrylate esters, and hydroxylated lower alkyl acrylates can be noted as exemplary. For example, acrylic acid/2-hydroxypropyl acrylate copolymers may be mentioned. Another exemplary group are the acrylic acid/allyl ether copolymers and terpolymers such as acrylic acid/allyl hydroxy propyl sulfonate ether and acrylic acid/ammonium allyl polyethoxy sulfate copolymers and terpolymers. Acrylamide and N-alkyl acrylamide homopolymers or copolymers with acrylic acid can also be mentioned as being effective. These polymeric dispersants may be present in amounts of from about 2-25 ppm, preferably about 4-8 ppm.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a water system having a total amount of from about 0.1-1.0 ppm of orthophosphate therein, an improved corrosion inhibition method comprising adding to said system:
    a) from about 0.3-0.5 ppm of a polyvalent metal ion selected from Al and Mn; and
    b) polymaleic acid or anhydride in an amount of about 1-25 ppm, said polymaleic acid or anhydride being water based.

2. A method as recited in claim 1 further comprising from about 2-25 ppm of c) a polymeric dispersant selected from acrylic acid, acrylic acid copolymers, acrylamides and N-alkylacrylamide polymers and copolymers.

3. A method for inhibiting the corrosion of metals in contact with an aqueous system comprising adding to said aqueous system a) from about 0.1-1.0 ppm of a polyvalent metal ion selected from the group of Al and Mn, and b) from about 1 to less than 50 ppm of a corrosion inhibitor compound selected from the group consisting of saccharic acid, polyepoxysuccinic acid, ammonia hydroxysuccinic acid, p-xylene hydroxysuccinic acid, phosphono-carboxylic acid/phosphonosuccinic acid mixture, phosphonosuccinic oliglomer, and water based polymaleic acid or polymaleic anhydride.

4. A method as recited in claim 3 wherein said saccharic acid is present.

5. A method as recited in claim 3 wherein said phophonosuccinicacid oligomer is present.

6. A method as recited in claim 3 wherein said a mixture of said phosphonosuccinic acid and said phosphono polycarboxylic acid is present.

7. A method as recited in claim 3 wherein said polyethoxysuccinic acid is present.

8. A method as recited in claim 3 wherein said ammonia hydroxysuccinic acid is present.

9. A method as recited in claim 3 wherein said p-xylylene hydroxysuccinic acid is present.

10. A method as recited in claim 3 wherein said water based polymaleic acid or polymaleic anhydride is present.

11. A method as recited in claim 7 further including saccharic acid.

12. A method as recited in claim 7 further including phosphonosuccinic acid oligomer.

13. A method as recited in claim 7 further including a mixture of phosphonosuccinic acid and phosphono polycarboxlic acid.

14. A method as recited in claim 7 further including ammonia hydroxysuccinic acid.

15. A method as recited in claim 7 further including p-xylene hydroxysuccinic acid.

16. A method as recited in claim 7 further including water based polymaleic acid or water based polymaleic anhydride.

* * * * *